(12) United States Patent
Montsma et al.

(10) Patent No.: US 10,158,420 B1
(45) Date of Patent: Dec. 18, 2018

(54) DYNAMIC SATELLITE BEAM SWITCHING

(71) Applicant: GOGO LLC, Chicago, IL (US)

(72) Inventors: David J. Montsma, Wheaton, IL (US); Erhard G. Trudrung, Lake Barrington, IL (US); Paul J. Powers, Naperville, IL (US); Marc A. Nesheim, Lake Zurich, IL (US)

(73) Assignee: GOGO LLC, Chicago, IL (US)

( * ) Notice: Subject to any disclaimer, the term of this patent is extended or adjusted under 35 U.S.C. 154(b) by 0 days.

(21) Appl. No.: 15/844,020

(22) Filed: Dec. 15, 2017

(51) Int. Cl.
*H04B 7/185* (2006.01)
*H04W 64/00* (2009.01)

(52) U.S. Cl.
CPC ....... *H04B 7/18508* (2013.01); *H04B 7/1858* (2013.01); *H04B 7/18513* (2013.01); *H04W 64/006* (2013.01); *H04B 7/18597* (2013.01)

(58) Field of Classification Search
CPC .............. H04B 7/2041; H04B 7/18513; H04B 7/18515; H04B 7/185; H04B 7/1853
See application file for complete search history.

(56) References Cited

U.S. PATENT DOCUMENTS

2014/0236469 A1* 8/2014 Callan ................... G08G 5/045
701/301

* cited by examiner

*Primary Examiner* — Keith Ferguson
(74) *Attorney, Agent, or Firm* — Marshall, Gerstein & Borun LLP; Randall G. Rueth

(57) ABSTRACT

A dynamic satellite map updating system measures geographic position and travel information of in-flight aircraft in a fleet of aircraft equipped to establish in-flight connectivity services from a plurality of satellite beams. The in-flight aircraft include an on-board satellite map program with satellite map parameters to indicate which satellite beam of a group of available satellite beams is the most desirable based on the in-flight aircraft's geographic location. The system selects in-flight aircraft, determines updated satellite map parameters for the selected aircraft, and transmits the updated satellite map parameters to the aircraft to assemble new satellite map programs to relieve wireless data outage conditions on one or more of the satellite beams. The dynamic satellite updating system may transmit the updated satellite map parameters over an existing satellite data connection to make up-to-date adjustments to the communications load among the group of available satellite beams.

20 Claims, 9 Drawing Sheets

300

| SATELLITE MAP FILE — 302 ||
|---|---|
| SATELLITE BEAM 1 | SATELLITE BEAM 1 CONNECTION PARAMETERS |
| SATELLITE BEAM 2 | SATELLITE BEAM 2 CONNECTION PARAMETERS |
| SATELLITE BEAM 3 | SATELLITE BEAM 3 CONNECTION PARAMETERS |
| . . . | . . . |
| SATELLITE BEAM N | SATELLITE BEAM N CONNECTION PARAMETERS |

↓ 306

| UPDATED SATELLITE MAP FILE — 304 ||
|---|---|
| SATELLITE BEAM 1 | SATELLITE BEAM 1 CONNECTION PARAMETERS |
| SATELLITE BEAM 2 | SATELLITE BEAM 1 CONNECTION PARAMETERS |
| SATELLITE BEAM 3 | UPDATED SATELLITE BEAM 3 PARAMETERS — 308 |
| . . . | . . . |
| SATELLITE BEAM N | SATELLITE BEAM 1 CONNECTION PARAMETERS |

FROM SATELLITE BEAM UPDATER

FIG. 3

DYNAMIC SATELLITE BEAM SWITCHING

BACKGROUND

In-flight connectivity services may be provided to in-flight aircraft via satellite connectivity technology, such as SwiftBroadband™, Ku-band, Ka-band, Ground-to-Orbit, 2Ku, and others. With these technologies, in-flight aircraft are equipped with satellite antennas to open a data connection with an orbiting communications satellite via an on-board modem to provide in-flight connectivity to end-users on the aircraft. Maintaining a network of satellites is challenging because individual satellites may need to enter and leave service due to maintenance, weather issues, connection saturation, etc. If the in-flight aircraft rely on static satellite maps to decide which satellite with which to connect for the provision of in-flight connectivity services, then the in-flight aircraft may attempt to connect to a satellite that is unavailable or no longer the best satellite for the provision of in-flight connectivity.

SUMMARY OF THE DISCLOSURE

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

BRIEF DESCRIPTION OF THE DRAWINGS

FIG. 3 is a schematic diagram of a satellite map file updating operation on a satellite map regarding a plurality of satellite beams providing in-flight connectivity at an in-flight aircraft.

DETAILED DESCRIPTIONS

Figure 1:
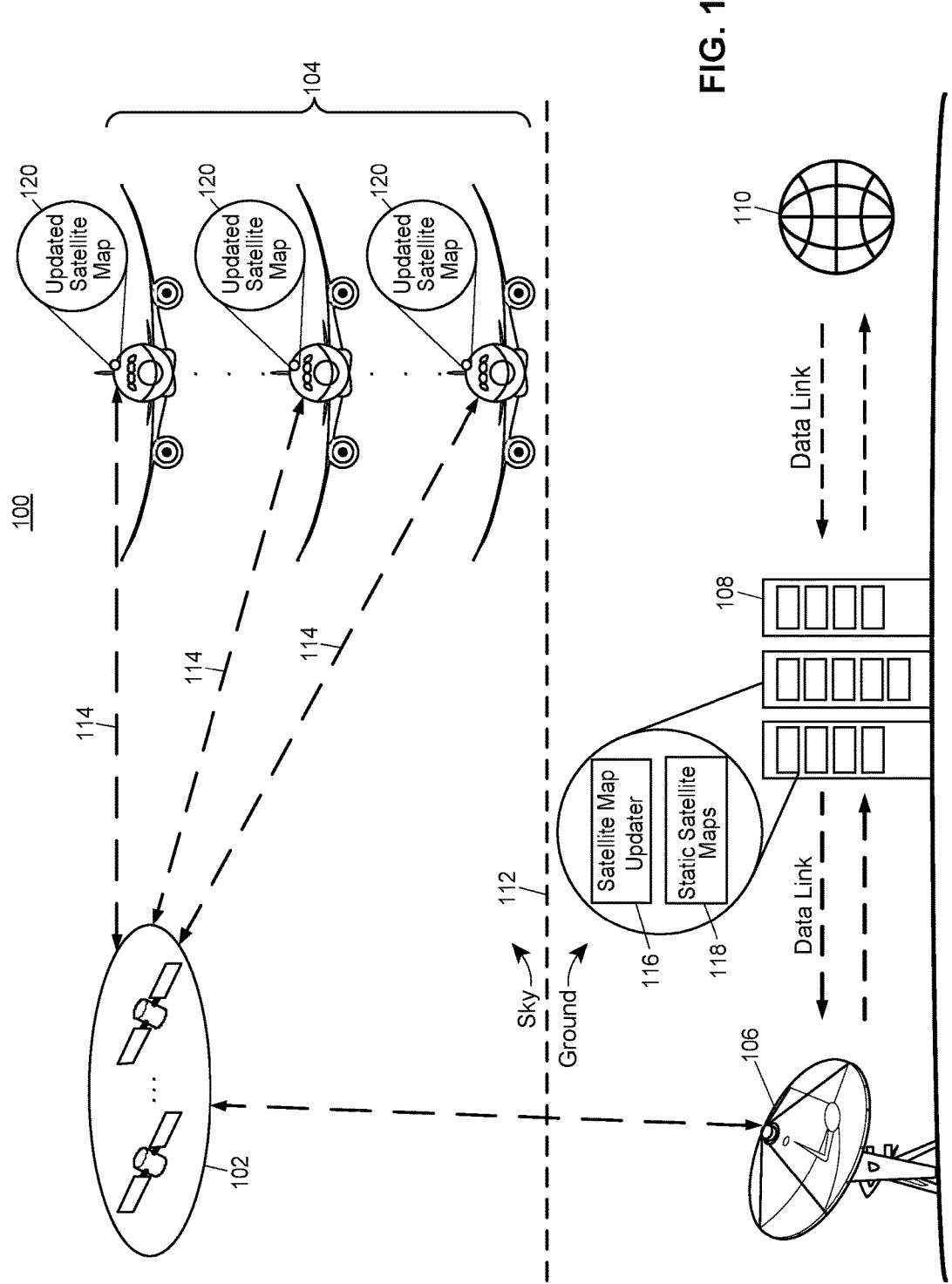
FIG. 1 is a schematic diagram of an example system for updating satellite maps regarding a plurality of satellite beams providing in-flight connectivity to a plurality of in-flight aircraft.

Communication systems that provide in-flight connectivity to aircraft over a satellite connection can become complex, with each network consisting of tens or hundreds of satellite beams supplied by multiple communications satellites. For an aircraft to determine which beam out of a large number of potential beams with which the aircraft should connect to access in-flight connectivity services, the aircraft must possess certain information regarding the various satellite beams. In-flight aircraft must know which beams cover which geographic areas as well as other information regarding the beam such as the satellite's location, transponder frequency, relative strength of the beam at various points within the beam's geographic area, etc.

One way for in-flight aircraft to obtain the information needed to select a satellite beam for connection is for the aircraft to maintain a static satellite map program (and an application configured to read the satellite map program) including information regarding the various available satellite beams. Static satellite maps are often received or updated by aircraft only at certain locations, such as when the aircraft are connected to a data link on the ground. Static satellite maps are therefore limited in terms of the timeliness of the information they can provide regarding the state of the in-flight connectivity. For example, a static satellite map program may not include newly added satellite beams or may include satellite beams that are down for maintenance (planned) or due to teleport outages (unplanned). In-flight aircraft may waste time attempting to connect to unavailable satellite beams or may connect to a satellite beam that is not an optimal or preferred beam for delivery of in-flight connectivity service to the aircraft or for the network as a whole. Aircraft may therefore experience gaps in in-flight connectivity service or service levels that are not as high as they could be if the aircraft knew to connect to different satellite beams. In other words, in-flight aircraft relying on static satellite maps can be thought of as "flying blind" to a degree with respect to the current state of a set of satellite beams because the static satellite map lacks up-to-date information regarding the state of the satellite beams.

Instead of relying only on static satellite maps, an in-flight connectivity provider network includes a ground station that is capable of determining and communicating dynamic changes to a static satellite map to in-flight aircraft over existing data connections to create on-board updated satellite maps (e.g., updated satellite maps). Dynamically changing the parameters of satellite maps on-board in-flight aircraft allows an in-flight connectivity provider network to effectively manage the resources available to the network from a central location, even as network conditions change while connected aircraft are in the air. Updated satellite map parameters need not be queued for distribution to aircraft only at certain times (e.g., when the aircraft has access to a network connection when grounded, undergoing routine maintenance, etc.). Instead, updates to the satellite map parameters may be made and distributed to a fleet of aircraft continuously as in-flight connectivity network conditions change over time.

Throughout this disclosure, reference is made to a satellite and a satellite beam interchangeably. In other words, if a system component or an operation is directed to connecting to "a satellite," the disclosure should also be construed alternatively, or additionally, to mean the system component or operation is directed to connecting to a communications beam emanating from a satellite and vice versa. Also as used herein, a "static" satellite map program refers to a satellite map program that may only be updated when the aircraft is in limited situations (e.g., on the ground with a ground data connection) and may not be updated while the aircraft is in-flight.

FIG. 1 is a schematic diagram of an example system 100 for managing a plurality of satellite beams 114 providing in-flight connectivity to a fleet of in-flight aircraft 104. FIG. 1 is generally divided into components above line 112 that are in-flight or in-orbit (sky) and components below line 112 (ground). As illustrated in the example of FIG. 1, the in-flight aircraft in the fleet of aircraft 104 assemble updated satellite map programs 120 that are more up-to-date than currently on-board satellite map programs. An updated satellite map program has the same or similar content as a static or currently on-board satellite map program (list of satellite beams, satellite beam connection information, etc.) except the parameters used to select a satellite beam have been updated by in-flight connectivity network ground station 108.

A satellite map program (e.g., a static satellite map program, a satellite map program with updated and/or load balanced parameters, etc.) may contain a list of satellite beams and other information relating to data connections with the beams including satellite vendor information, EIRP and G/T information, regulatory (no-transmit) zone polygons, adjacent satellite interference data, elevation data, or business reasons (e.g., special satellites authorized to transmit over Russia, etc.). A static satellite map program may include satellite map parameters that effectively give weights to the various beams depending on factors such as the present geographical location of the aircraft. An in-flight aircraft may then select a beam with a high, or the highest, weighted value of the various available satellite beams. In one implementation, the static satellite map program may be viewed as a geolocation lookup table that shows which satellite beams cover which locations and the desirability of each satellite beam in each location.

Since the desirability of a satellite beam changes as the in-flight aircraft's location changes, the relative desirability of the satellite beams will change as the aircraft progresses along its route. At some point along its route, an aircraft will near the edge of a connected satellite beam's range and it will be advisable for the aircraft to switch to a more attractive satellite beam to prevent a gap in service or diminishment of the quality of service.

The aircraft in the fleet of in-flight aircraft control an on-board modem to connect to one of a plurality of communications satellites 102 via a satellite beam 114. The connection over satellite beam 114 provides in-flight connectivity to the aircraft in the fleet of aircraft 104 via a wireless connection between the satellite in the group of satellites 102 and a teleport 106. The teleport 106 is communicatively connected to a ground station 108, which is in turn communicatively connected to another network 110, such as the Internet or another public- or private-switched packet network or another type of network.

Once an aircraft in the fleet of aircraft 104 has established a communications connection with the in-flight connectivity network ground station 108, the aircraft may receive updates (e.g., updated and/or load balanced satellite map parameters) to the aircraft's static or on-board satellite map program (e.g., to a satellite map program that was updated on the ground or a satellite map program that has been previously updated by the in-flight connectivity network ground station 108). The in-flight connectivity network ground station 108 may make ongoing, up-to-the-minute adjustments and/or updates to satellite map parameters that it sends to the aircraft in the fleet of aircraft 104. When an aircraft in the fleet of aircraft 104 receives updated satellite map parameters from the in-flight connectivity network station 108, the in-flight aircraft updates the aircraft's local satellite map program to include the new satellite map parameters, thus creating an updated satellite map program 120. In one implementation, the in-flight connectivity network ground station 108 sends only updates satellite map parameters to an in-flight aircraft in the fleet of aircraft 104 (e.g., the in-flight connectivity network ground station 108 sends only satellite connection parameters that have changed in comparison to the satellite map already on the aircraft). In another implementation, the in-flight connectivity network station 108 may transmit a complete new satellite map program to an aircraft in the fleet of aircraft 104 to replace a static on-board satellite map program with the updated satellite map program 120.

The in-flight connectivity network station 108 may create updated satellite map parameters for certain in-flight aircraft in the fleet of aircraft 104 connected to the satellites 102 or it may create custom updated satellite map parameters for a subset of the fleet of aircraft 104 or for a single aircraft in the fleet of aircraft 104. The in-flight connectivity network ground station 108 may therefore manage the communications load of the fleet of aircraft 104 across available communications satellites 102 and available satellite beams 114 to account for events that may interfere with the level of service experienced by in-flight connectivity users on the aircraft in the fleet of aircraft 104.

Aircraft connected to the satellites 102 will likely vary in terms of demand for satellite connection services and thus demand on the satellite beams to which they are connected. Larger aircraft with more passengers may be likely to supply more in-flight connectivity customers, but demand may drop sharply in some situations, such as when the aircraft is flying late at night and some passengers are sleeping. Aircraft may be assigned weighting values based on an expected satellite beam load for the aircraft, but the weighting values may not always reflect the true demand for an aircraft. When there is a gap between the expected and actual satellite beam demand for a group of aircraft, the satellite beams to which the aircraft are connected may become saturated unless the satellite beam load can be rebalanced.

In one implementation, one of the communications satellites in the group of satellites 102 may require routine or emergent maintenance that will temporarily remove the satellite and its satellite beams from service. Any aircraft in the fleet of aircraft 104 that attempt to connect to the satellite undergoing maintenance during a maintenance window will not be able to connect. Aircraft in the fleet of aircraft 104 that are not able to update their satellite maps (e.g., the aircraft have only static satellite maps) may continue to attempt to a satellite that is out of service because the on-board or static satellite maps used by the aircraft do not reflect that a satellite beam is out of service during a maintenance window. Although the aircraft in the fleet of aircraft 104 may eventually connect to another satellite beam, in-flight connectivity service will be interrupted while the aircraft attempts to connect to a satellite beam that is unavailable. Operators of the group of communications satellites 102 may try to schedule maintenance at times of relatively lower usage (e.g., during the night in the geographical area served by the satellite) but doing so may be burdensome to the satellite operator because employees must work during the night and doing so will still interrupt service for some customers, especially on longer haul flights where passengers are more likely to seek in-flight connectivity services even during nighttime.

To avoid scheduling maintenance in the middle of the night, the in-flight connectivity network ground station 108 may push out updated satellite map parameters to the aircraft in the fleet of aircraft 104 that include timestamps relating to the maintenance of one of the satellites in the group of satellites 102. The timestamps may indicate that one of the satellites will be unavailable for a period of time while the satellite is undergoing maintenance. If the aircraft in the fleet of in-flight aircraft 104 receive the updated satellite map parameters in advance of the maintenance window, then the in-flight aircraft will not attempt to connect to the satellite while it is undergoing maintenance, even if the satellite would have been the highest connection priority satellite for an in-flight aircraft based on the in-flight aircraft's geographic location and based on the other factors used by the in-flight aircraft to select a satellite beam 114.

In another implementation, a satellite in the group of satellites goes offline unexpectedly. All aircraft in the fleet of aircraft 104 that are attempting to connect to a satellite beam originating at the satellite that went offline unexpectedly will experience in-flight connectivity service disruptions. The in-flight connectivity network ground station 108 may then push updated satellite map parameters to any or all aircraft in the fleet of aircraft 104 on an emergency basis to change the relative priority of satellite beam selection on the in-flight aircraft such that the aircraft will select satellite beams other than the satellite beam is out of service.

Figure 4:
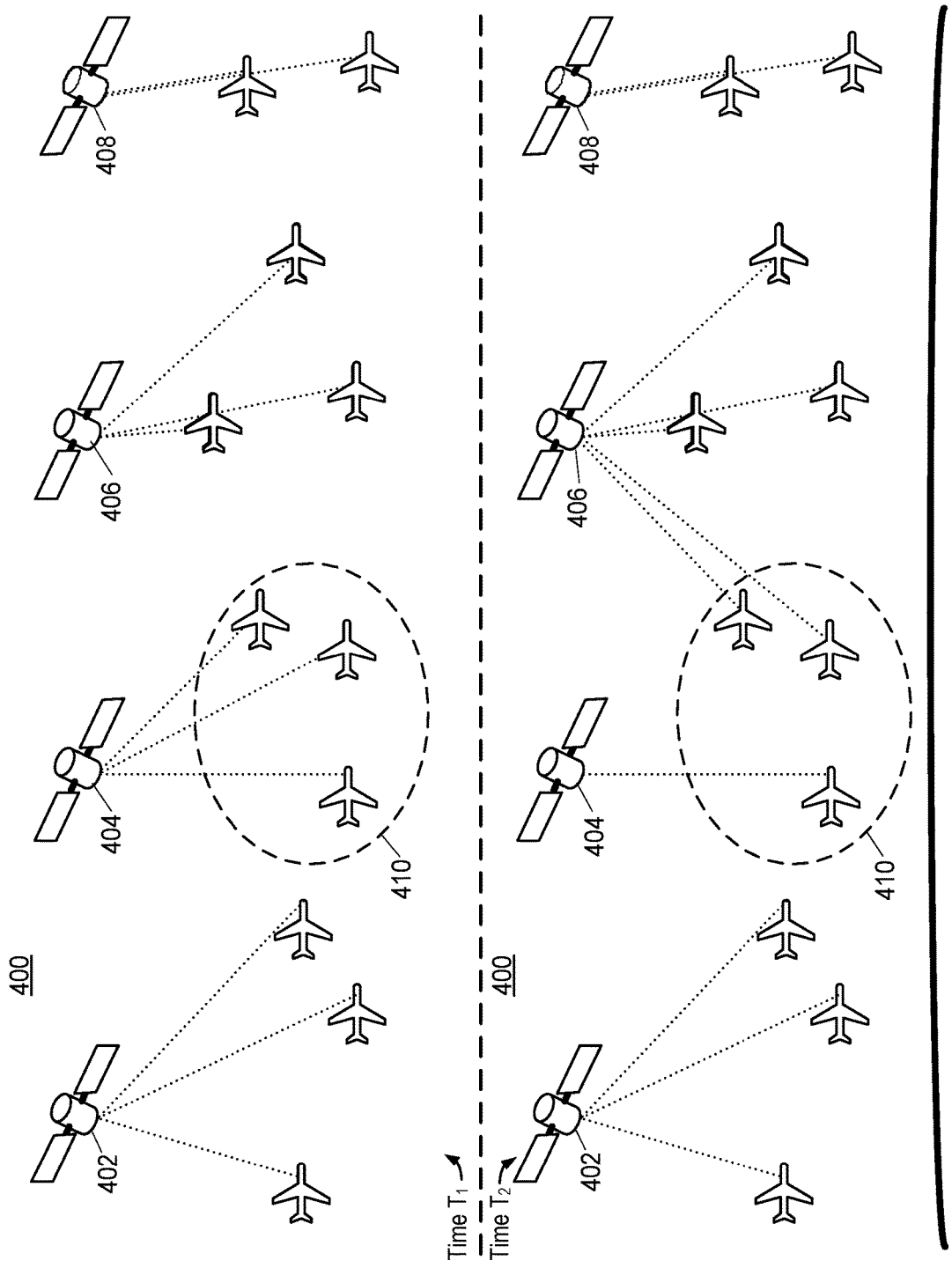
FIG. 4 is a schematic diagram of an example system for updating satellite maps regarding a plurality of satellite beams providing in-flight connectivity to a plurality of in-flight aircraft before and after an updating operation.

The in-flight connectivity network station 108 includes several components that are described in more detail with respect to FIG. 4. One set of components is a satellite map updater 116. The satellite map updater 116 obtains information regarding the in-flight aircraft in the fleet of aircraft 104 including geographical position information of the in-flight aircraft and wireless data connection information regarding the in-flight aircraft in the fleet of aircraft 104. The information obtained by the satellite map updater 116 may be collected directly or indirectly. For example, the satellite map updater 116 may request geographical position information to be transmitted from an aircraft in the fleet of aircraft 104 directly to the in-flight connectivity network ground station 108. Alternatively, or additionally, the satellite map updater 116 may obtain geographical position information from flight plans, last known position and direction of aircraft, etc. The satellite map updater 116 also obtains connection information regarding the satellites 102 and the satellite beams 114. For example, the satellite map updater 116 has access to static satellite maps 118 that are used by in-flight aircraft in the fleet of aircraft 104. The satellite map updater 116 may infer satellite connections by individual aircraft in the fleet of aircraft 104 based on the static satellite maps and/or geographical position information obtained regarding the fleet of in-flight aircraft 104. The satellite map updater 116 may alternatively, or additionally, obtain connection information directly from the in-flight aircraft in the fleet of aircraft 104.

In some implementations, the in-flight connectivity network station 108 applies a hysteresis mechanism to determine whether to update map parameters to switch a particular aircraft from one satellite beam to another. If the beam to which an in-flight aircraft is connected is not as attractive as another satellite beam available to the aircraft, then switching beams may provide an increase in performance to in-flight customers on the aircraft. Switching satellite beams, however, may also cause a degradation of service due to a temporary outage in network connectivity while the modem is switching beams. The length of the outage in network connectivity may depend on the distance between the aircraft and the edge of a coverage zone of the satellite beam. Typical beam switch times range from ten seconds to one minute. Near the edges of the coverage zone, a break in service may be longer than near the interior of the coverage zone. It may therefore be the case that switching satellite beams is overall not worth the switch due to balancing the increased quality of the available beam against the break in service due to switching.

One way for the in-flight connectivity network station 108 to determine whether a beam switch is worth a potential in-flight connectivity disruption is to assign a desirability value to satellite beams. The desirability value may depend on factors such as an expected signal-to-noise ratio of the beam when connected to by an aircraft at a particular location. A temporary outage in network connectivity may also be assigned a desirability value (e.g., a negative value) for comparison to the desirability value expected after a switch. After applying a desirability value of the cost of switching to a potentially available satellite beam, the in-flight connectivity network station may determine that quality of service would benefit more from not switching beams. In another implementation, a desirability level of an available beam must exceed the desirability value of a connected beam by a fixed margin (e.g., a margin determined in advance) before the in-flight connectivity network station 108 will determine a load balancing switch should be made. In particular, if an aircraft is flying along the boundary of two beams, then there is a risk the aircraft might switch back and forth repeatedly between the two beams. Applying a desirability value to the temporary outage requires that a new satellite beam be significantly better than a connected beam and protects against repeated service interruptions without substantial gain in service quality. As used herein a quality margin value means the amount by which quality of in-flight connectivity service must improve before switching from one satellite beam to another available beam.

Figure 2:
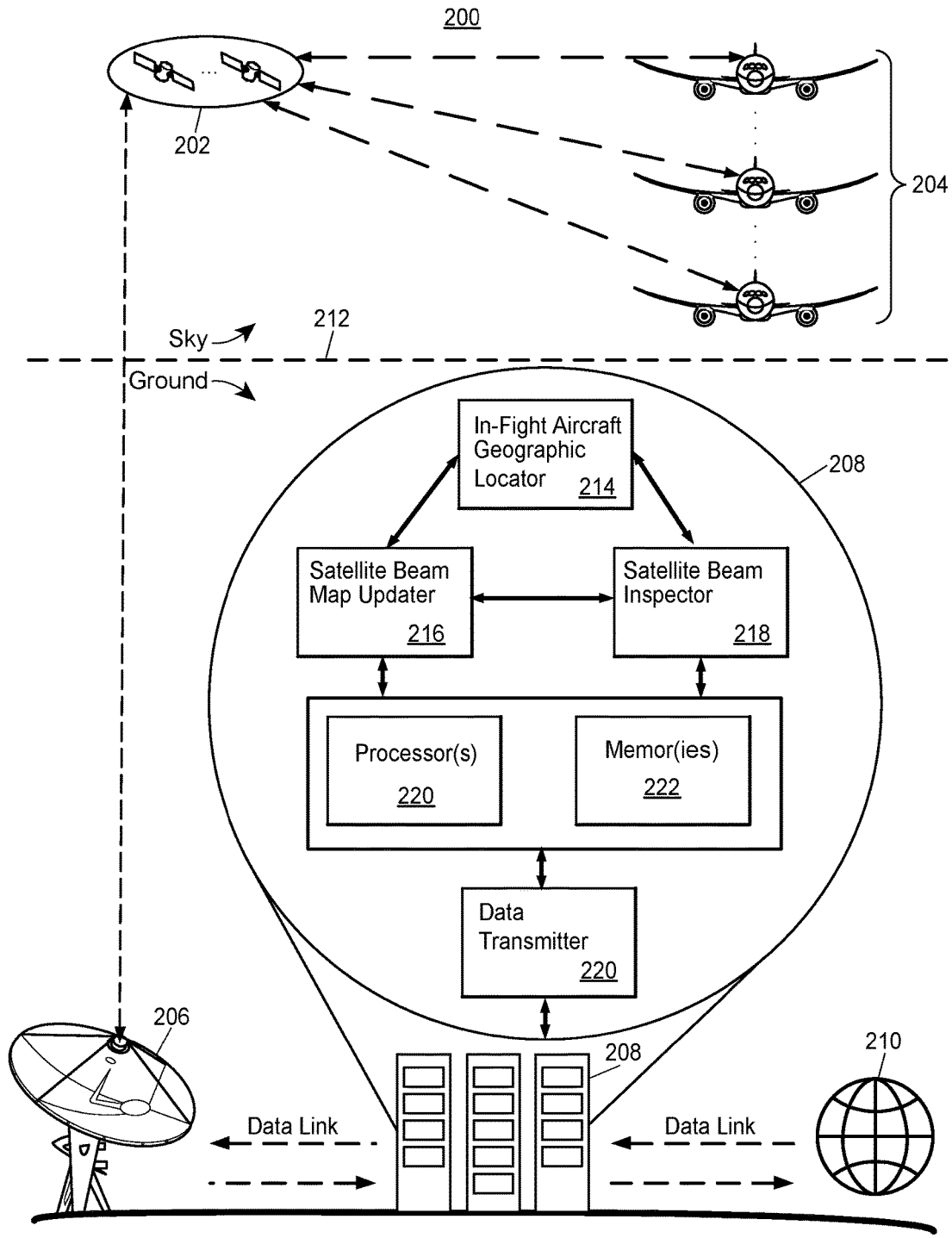
FIG. 2 is a schematic diagram of an example system for updating satellite maps regarding a plurality of satellite beams providing in-flight connectivity to a plurality of in-flight aircraft illustrating example components of a satellite map updater ground station.

FIG. 2 is a schematic diagram of an example system 200 for updating satellite maps regarding a plurality of satellite beams providing in-flight connectivity to a plurality of in-flight aircraft 204 illustrating example components of a satellite map updater ground station 208. In the example illustrated in FIG. 2, the in-flight aircraft in the fleet of aircraft 204 assemble an updated satellite map program that is more up-to-date than a static or on-board satellite map program.

The aircraft in the fleet of in-flight aircraft control an on-board modem to connect to one of a plurality of communications satellite 202 via satellite beams to provide in-flight connectivity to the aircraft in the fleet of aircraft 204 via a wireless connection between the satellite in the group of satellites 202 and a teleport 206. The teleport 206 is communicatively connected to an in-flight connectivity network station 208, which is in turn communicatively connected to another network 210, such as the Internet or another public- or private-switched packet network or another type of network.

Once an aircraft in the fleet of aircraft 204 has established a communications connection with the ground station 208, the aircraft may receive updates to the aircraft's static satellite map program. An in-flight connectivity network ground station 208 may make ongoing, up-to-the-minute adjustments to updates satellite map parameters that it sends to the aircraft in the fleet of aircraft 204. When an aircraft in the fleet of aircraft 204 receives updated satellite map parameters from an in-flight connectivity network ground station 208, the receiving aircraft updates the aircraft's local static (or previously updated) satellite map program to include the new updated satellite map parameters. In one implementation, an in-flight connectivity network ground station 208 sends only updated satellite map parameters to an aircraft 204. In another implementation, the ground station may transmit a complete new satellite map program to an aircraft in the fleet of aircraft 204 to replace a static on-board (or previously updated) satellite map program.

In the system 200, the in-flight connectivity network ground station 208 has a variety of components for updating satellite map parameters. One component of the in-flight connectivity network station 208 is the in-flight aircraft geographic locator 214. In the example implementation illustrated in FIG. 2, the in-flight aircraft geographic locator 214 establishes or approximates the geographical locations of aircraft in fleets of aircraft that are configured to connect to the communication satellites 202. The in-flight geographic locator 214 establishes or approximates the geographical locations of the aircraft according to one or more of a variety of manners (e.g., self-reported aircraft location, radar aircraft location, an aircraft's flight plan and information regarding revisions thereto, triangulated location, position reported by satellite, etc.).

Once the in-flight aircraft geographic locator 214 has measured the geographic locations of the fleet of aircraft 204, the geographic location information of the fleet is available to other components in the example system 200 for updating satellite map parameters for in-flight aircraft to connect to satellite beams providing in-flight connectivity. In an implementation, updated satellite map parameters or adjusted priority parameters included in a satellite map program depend at least in part on the geographic location of an aircraft connected to the in-flight connectivity network, and the components of ground station 208 that calculate the updated satellite map parameters may know the geographical location of aircraft in the fleet of aircraft 204 to calculate the effects of changes to satellite map parameters on the network load and to prevent aircraft from connecting to satellite experiencing outage conditions across all available satellites 202.

The in-flight aircraft geographic locator 214 may also collect other information regarding the aircraft in the fleet of aircraft 204 that has a bearing on the future geographic position of the aircraft. Aircraft direction and speed may be collected to estimate an aircraft's future position. Direction and speed information may be collected directly from an aircraft in the fleet of aircraft 204 or it may be collected by indirect means (e.g., access to an aircraft's flight plan, instructions from an air-traffic controller to the aircraft, information regarding weather, local traffic, temporary and/or permanent flight restricted areas, an aircraft's final destination, etc.). Information collected by the in-flight aircraft geographic locator 214 that has an indirect bearing on the future geographical position of an aircraft in the fleet of aircraft 204 may be collected from a carrier operating an aircraft, from a government authority, etc.

Another component of the in-flight connectivity network station 208 is the satellite beam inspector 218. The satellite beam inspector 218 is communicatively connected to one or more of the satellites 202 via a teleport 206 or via other means. The satellite beam inspector 218 monitors the satellites in the group of satellites 202 to collect information (e.g., operability information, loan information, status information, etc.).

The satellite beam inspector 218 may monitor outage periods for the satellite beams in the system 200. Outage periods for the satellites in the group of satellites 202 may be collected in a variety of ways. In one implementation, the satellite beam inspector 218 may query the satellites in the group of satellites 202 directly via the data link with the teleport 206, which is connected communicatively to the satellites 202. The data link with the teleport 206 may be a variety of different types of data links. In one implementation, the data link is a telco-data link that includes lines leased by the operator of the in-flight connectivity network station 208. In another implementation, the data link includes private lines (e.g., optical) that are owned by the operator of the in-flight connectivity network station 208. If the satellite beam inspector 218 cannot make contact with any of the satellites in the group of satellites 202 when it should be able to based on the location of the teleport 206, then the satellite beam inspector 218 may conclude that the satellite it cannot reach is out of service (e.g., experiencing an outage).

In at least one implementation, the satellite beam inspector 218 collects information indirectly about the status of the satellites in the group of satellites 202 by collecting information from the aircraft in the fleet of aircraft 204 that are connected to respective satellites. The aircraft in the fleet of aircraft 204 are themselves in communication with the in-flight connectivity network station 208 and can report on characteristics of the in-flight connectivity service the aircraft receive from the satellites 202 to the satellite beam inspector 218. One type of information that the aircraft in the fleet of aircraft 204 can report to the satellite beam inspector 218 are the data rates for uplink and downlink with the satellite 202 that the aircraft has experienced while connected to the satellite 202. The aircraft in the fleet of aircraft 204 can also report information to the satellite beam inspector 218 to indicate to the satellite beam inspector 218 loads on respective satellites in the group of satellites 202 (e.g., when the aircraft was connected to a satellite, how long the aircraft was connected to the satellite, how much total data was exchanged between the aircraft and the satellite, how much data was customer data and how much data was system data, etc.). The satellite beam inspector 218 may further receive information regarding connection difficulties (e.g., dropped packets, connection interruptions, etc.) regarding a satellite beam from aircraft in the fleet of aircraft 204.

In another implementation, the satellite beam inspector 218 receives information regarding planned outages of the satellites 202 (e.g., planned maintenance). The satellite beam inspector 218 may receive planned outage information from the operator of the satellites 202 or the planned outages may occur on a regular schedule that the satellite beam inspector 218 may access. The outage information may include the duration of the outage, a start time of the outage, an end time of the outage, a diminished capacity of the satellite beam during the outage, etc.

Another component of the ground station 208 is the satellite beam map updater 216. The satellite beam map updater 216 evaluates whether the status information supplied by the satellite beam inspector 218 indicates that a satellite beam likely or possibly satisfies an outage condition for any of the satellites in the group of satellites 202. If any such outage condition is satisfied, the satellite beam map updater 216 determines adjusted or updated satellite map parameters for one or more aircraft in the plurality of aircraft 204. The updated or adjusted satellite map parameters are determined by the satellite beam map updater 416 based on several types of information and rules (information regarding the geographic locations of the aircraft in the fleet of aircraft 204, load level information of the satellites in the group of satellites 202, direction and speed of the aircraft in the fleet of aircraft 204, status information regarding the satellite beams in the system 200, etc.).

The satellite beam map updater 216 determines a projected balanced load level among the satellites in the group of satellites 202 based on the status information and expected outage conditions. Factors bearing on the rules used by the satellite beam map updater 216 include relative satellite beam strength in the center of a satellite beam compared to at the edge of the satellite beam. Since aircraft are likely to encounter a weaker signal when the aircraft is located geographically at the edge of a satellite beam, the aircraft is likely to experience a longer handshake and period of time to open the communications session than if the aircraft were located closer to the geographic center of the satellite beam. Since a longer period of time to open a communications session is more likely to expose users to a gap in service and likely lower quality service, the satellite beam map updater 216 may avoid adjusted updated satellite map parameters that are likely to cause an aircraft in the fleet of aircraft 204 to choose to connect to a satellite beam when the aircraft is near the geographic edge of the beam.

In at least one implementation, the satellite beam map updater 216 determines a series of adjustments to satellite map parameters to send to one or more of the aircraft in the fleet of aircraft 204 over a period of time. Transmitting a series of adjustments to the satellite map parameters may cause certain aircraft in the fleet of aircraft 204 to switch to another satellite beam when the aircraft receive ones of the set of updates. By shifting the satellite beams to which an aircraft is connect while the aircraft is in a geographic zone that is served by more than one suitable satellite beam allows the satellite beam map updater 216 to move other aircraft in the fleet of aircraft 204 to the satellite beam from which others of the aircraft have switched away. Efficient satellite map updating solutions change as various the satellite beams become more desirable to aircraft as the aircraft move along their routes over time. Transmitting sets of updated satellite map parameters over time allows the satellite beam map updater 216 to continually supply efficient satellite map parameters to the fleet 204 as status and outage conditions change over time.

The satellite beam map updater 216 may rely on heuristics to refine adjustments to updated satellite map parameters to send to aircraft in the fleet of aircraft 204. Aircraft in the fleet of aircraft 204 may communicate quality of service data back to the ground station 208 for logging and analysis to improve future satellite map parameter update decisions. In an implementation, quality of service data includes whether an aircraft in the fleet of aircraft 204 encountered difficulty in connecting to one of the satellites 202. With this information, operations staff may investigate and potentially take action to minimize the impact to other aircraft in the fleet of aircraft 204. Operations staff may be able to make configuration changes to one of the satellites 202 to remedy connection difficulties. Heuristics data may also provide information regarding the satellite beam topology that can be used by the satellite beam map updater 216 to update satellite map parameters. Characteristics of the beam topology can be taken into account by the satellite beam map updater 216 to find ever more favorable distributions among the aircraft in the fleet of aircraft 204 seeking in-flight connectivity service from the satellites 202.

In the example illustrated in FIG. 2 the in-flight connectivity network station 208 includes processor(s) 220 and memor(ies) 222. Processor(s) 220 and memor(ies) 222 may store instructions and carry out any of the operations of the ground station 208 as described herein. For example, memor(ies) 222 may store instructions implementing the functions of the in-flight geographic locator 214, the satellite beam inspector 218, the satellite beam map updater 216, the data transmitter 212, etc. that are executable by the processor(s) 220. The memor(ies) 222 may also store information collected by the aforementioned components of the ground station 208 including information relating to the group of satellites 202 and the fleet of aircraft 204.

Another component of the in-flight connectivity network station 208 is the data transmitter 212. The data transmitter 212 is connected communicatively to the satellites 202 via the teleport 206, and thus is connected communicatively to the aircraft in the fleet of aircraft 204 that have open connections with one of satellites 202. The data transmitter 212 is configured to send information to aircraft in the fleet of aircraft 204 including updated satellite map parameters for the aircraft to assemble into an updated satellite map program. The data transmitter 212 is further configured to receive information from aircraft in the fleet of aircraft 204 including information regarding the state of the aircraft (geographic position, direction and speed, information regarding a connection with one of the satellites 202, etc.). The data transmitter 212 is further configured to exchange information via a Telco-data link with another network 210, such as a private or public packet-switched network such as the Internet. Information exchanged with the other network 210 may include information relating to the state of the aircraft in the fleet of aircraft 204 such as information supplied by an aircraft operator, a government authority, expected satellite beam outage information, current outage information, etc. Information exchanged with the other network 410 may also include customer or user data received from and/or sent to users of the in-flight connectivity network on aircraft in the fleet of aircraft 204.

FIG. 3 is a schematic diagram 300 of a satellite map file updating operation 306 on a satellite map 302 regarding a plurality of satellite beams providing in-flight connectivity at an in-flight aircraft. A satellite map file 302 is on-board an in-flight aircraft offering in-flight connectivity services. The satellite map file 302 may be a static map file that has been with the aircraft through the duration of a flight or the satellite map file 302 may be a satellite map file that has been updated dynamically already. If the satellite map file 302 has been updated dynamically, the update may have been an update only to certain satellite map parameters or a replacement of the satellite map 302 in its entirety. Updates to satellite map parameters include adding or removing a satellite beam (e.g., a row in the map) in addition to modifying the satellite beam connection parameters associated with a satellite beam.

In one implementation, the satellite map file 302 includes one or more potentially available satellite beams to an in-flight aircraft (e.g., all the satellite beams on an in-flight connectivity network) and a set of satellite beam connection parameters associated with the beam. The satellite beam connection parameters associated with a satellite beam provide information regarding the satellite beam (e.g., satellite beam connection information, updated beam status, connection intensity information, etc.). The updating operation 306 may be performed by a mobility control program executing on-board an in-flight aircraft. In another implementation, the updating operation 306 is performed by beam switching logic in a modem on-board an in-flight aircraft. In yet another implementation, the updating operation 306 is performed at a ground station of an in-flight connectivity network, and the updated satellite map file 304 is received by the in-flight aircraft.

The updating operation 306 receives updated satellite beam parameters 308 regarding one or more of the satellite beams tracked by the satellite map file 302 and creates an updated satellite map file 304 by replacing and/or updating satellite beam parameters with the updated satellite beam parameters 308. The updated satellite beam parameters 308 may include updated satellite beam connection information, updated beam status, updated connection intensity information, updated geographic coverage information, updated priority information, etc.). In one implementation, the updated satellite beam parameters 308 include timestamps during which the in-flight aircraft should not connect to the satellite beam (e.g., if there is planned maintenance or an unplanned outage of the satellite beam occurring during a period of time defined by the timestamps). In another implementation, the updated satellite beam parameters 308 remove timestamps during which an in-flight aircraft should not connect to the satellite beam (e.g., if a satellite beam outage has ended). In yet another implementation, the updated satellite beam parameters 308 alter a priority level of a satellite beam relative to other available satellite beams for purposes of load balancing, moving in-flight aircraft connections away from beams that are experiencing problems but still functioning, etc.

FIG. 4 is a schematic diagram of an example system 400 for updating satellite maps regarding a plurality of satellite beams providing in-flight connectivity to a plurality of in-flight aircraft before and after an updating operation. FIG. 4 illustrates two times designated time $T_1$ and time $T_2$ with time $T_1$ shown above the dotted line and time $T_2$ shown below the dotted line. In time $T_1$, a plurality of communications satellites 402, 404, 406, and 408 are in orbit and provide in-flight connectivity services to a plurality of in-flight aircraft. In particular, the communications satellite 404 provides in-flight connectivity services to a group of the in-flight aircraft 410.

Between time $T_1$ and time $T_2$, the communications satellite 404 experiences a service outage. The service outage may be due to scheduled maintenance, a fault on the satellite, outside factors (e.g., weather, adverse conditions in Earth orbit, backhaul outage, etc.), or unknown to the operators of the communications satellite 404. Whatever the cause of the outage of communication satellite 404, updated satellite map parameters have been pushed to the in-flight aircraft in the group of aircraft 410 from an in-flight connectivity network ground station between the times $T_1$ and $T_2$. The updated satellite map parameters pushed to the in-flight aircraft in the group of aircraft 410 by the ground station cause the aircraft in the group of aircraft 410 to establish connections with communications satellites other than communications satellite 404 (e.g., communications satellites 402 and 406) that are able to provide in-flight connectivity services to the aircraft in the group 410. Causing aircraft in group 410 to switch away from satellite 404 before an interruption to connectivity service provided by satellite 404 effectively manages connectivity services and protects end-users traveling on aircraft in group 410 from service interruptions. Likewise, causing aircraft in group 410 to switch away from satellite 404 in near real-time after an unexpected interruption to connectivity service provided by satellite 404 sharply diminishes the impact of the service interruption to end-users on aircraft in group 410. An in-flight connectivity network ground station, despite its physical location, therefore has an "eye in the sky" perspective of the entire in-flight connectivity network. By dynamically updating satellite maps on individual airplanes, the in-flight connectivity network ground station counteracts the problem of individual aircraft "flying blind" with respect to the current state of the in-flight connectivity network by supplying the aircraft with updated satellite map parameters such that aircraft do not waste time attempting to connect to sub-optimal satellite beams 114 (e.g., spending time connected to satellite beams that supply lower levels of service, making connections to satellite beams 114 in a way that is unduly or unnecessarily burdensome to the in-flight connectivity network, etc.).

Figure 5:
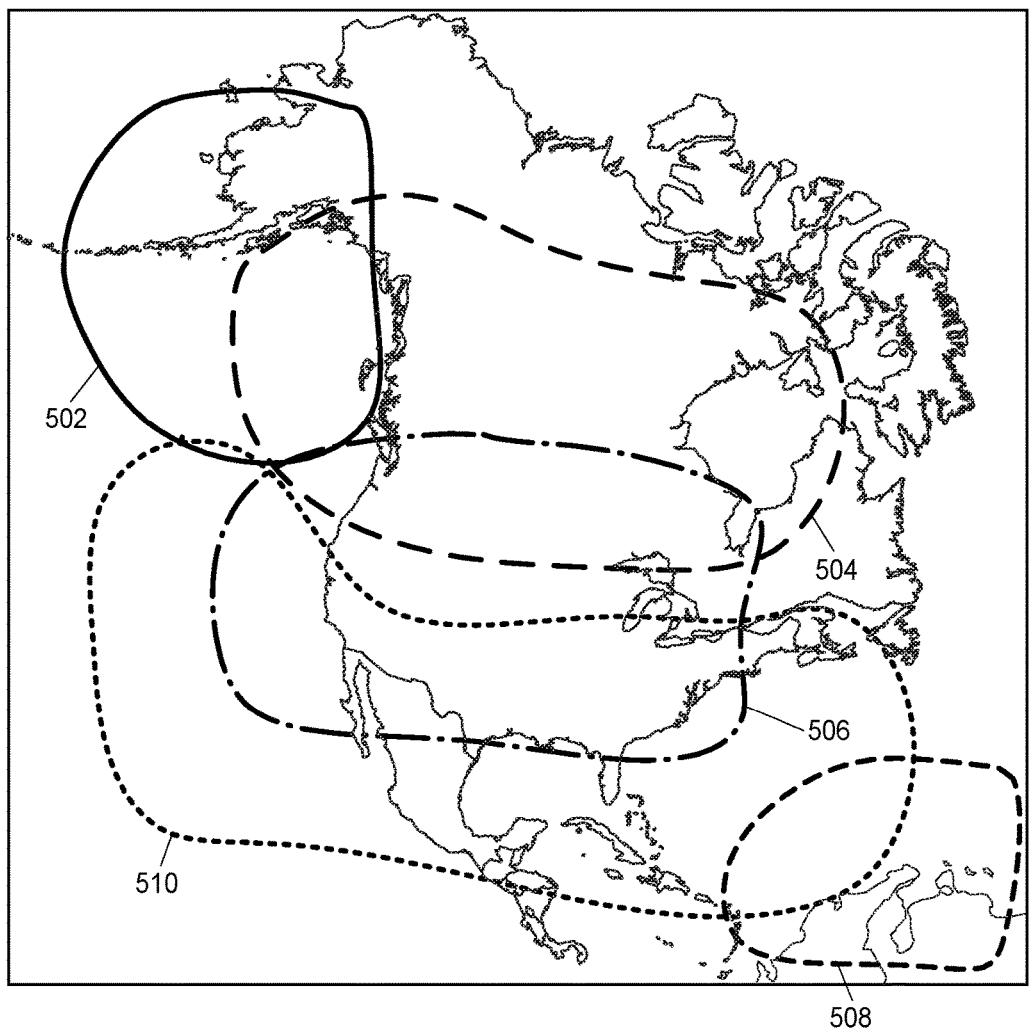
FIG. 5 is an example satellite beam coverage map illustrating satellite beam coverage areas in an example system for updating satellite maps regarding a plurality of satellite beams providing in-flight connectivity in North America.

FIG. 5 is an example satellite beam coverage map 500 illustrating satellite beam coverage areas 502, 504, 506, 508, and 510 in an example system for updating satellite maps in aircraft connecting to a plurality of satellite beams providing in-flight connectivity in North America. Each of the satellite beam coverage areas 502, 504, 506, 508, and 510 represent an example geographic area for which the satellite beam could provide in-flight connectivity to an in-flight aircraft. The satellite beam coverage map 500 illustrates that some satellite beam coverage zones overlap, such as a bottom portion of satellite coverage zone 504 and an upper portion of satellite coverage zone 506. Overlapping regions such as these provide opportunities for transitioning aircraft away from satellites that have experienced or are likely to experience an outage condition. By transmitting updated satellite map parameters to aircraft currently in the overlapping region to instruct the aircraft to re-prioritize beams and switch from one beam to another to balance the communications load across the satellites.

Figure 6:
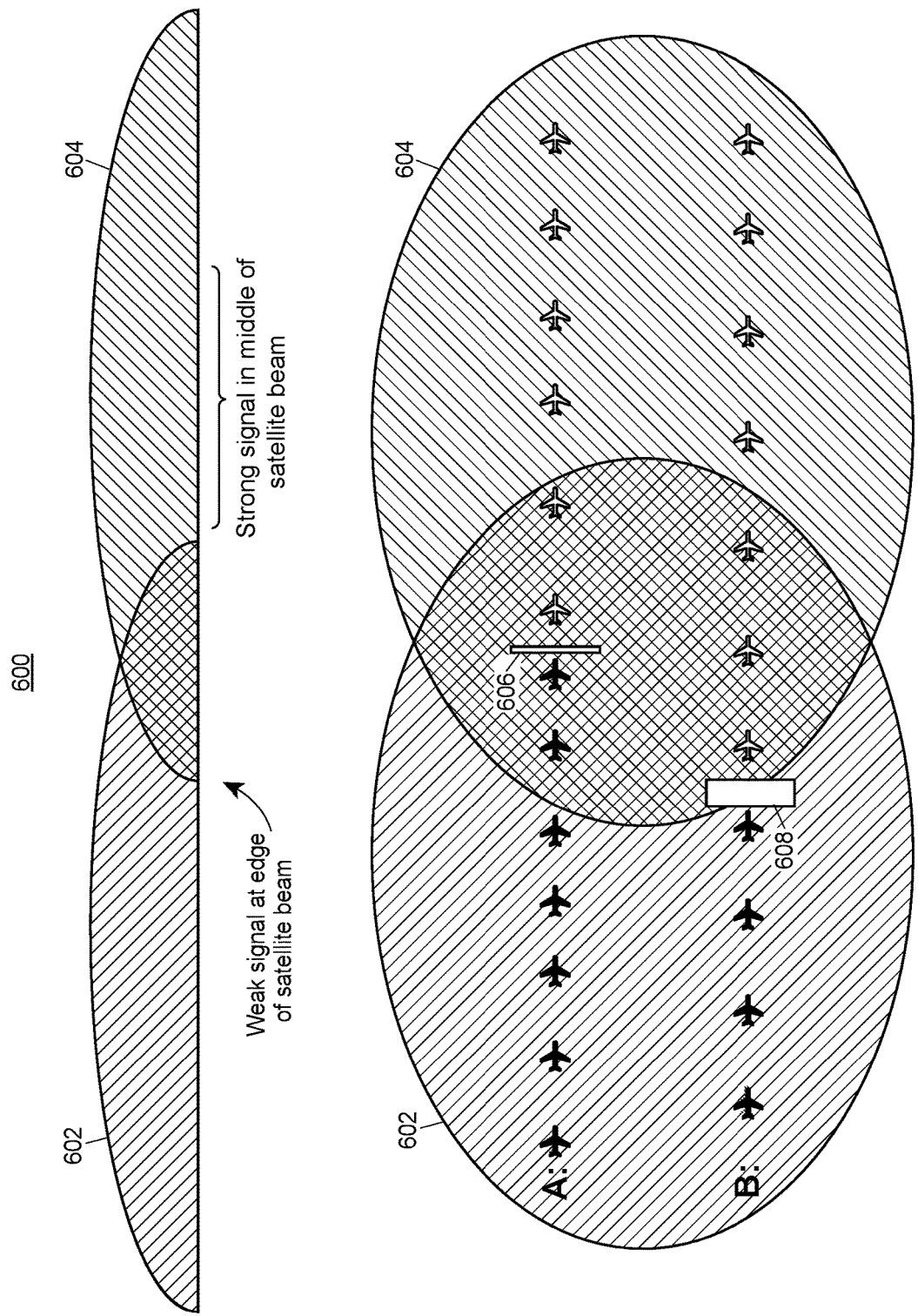
FIG. 6 is a schematic diagram illustrating satellite beam signal strength in relation to beam geometry in an example system for updating satellite maps regarding a plurality of satellite beams providing in-flight connectivity.

FIG. 6 is a schematic diagram 600 illustrating satellite beam signal strength in relation to beam geometry in an example system for updating satellite parameters in satellite maps for a plurality of satellite beams providing in-flight connectivity. Two overlapping satellite beam coverage areas 602 and 604 are shown in side-view and above-view. As illustrated in FIG. 6, a satellite signal is weaker near the edge of the satellite beam coverage zone 604 compared to the center of the zone. Flight progressions A and B illustrate two example flight paths from satellite beam coverage area 602 into satellite beam coverage area 604 over time. Flight progression A attempts a communications switch from the satellite beam represented by satellite beam coverage zone 602 to the satellite beam represented by satellite beam coverage zone 604 at a location 606. Since location 606 is nearer to the center of satellite coverage zone 604, the transition occurs more quickly. Flight progression B, on the other hand, attempts a communications switch from the satellite beam represented by satellite beam coverage zone 602 to the satellite beam represented by satellite beam coverage zone 604 earlier at a location 608. Since location 608 is nearer to the edge of satellite coverage zone 604, the transition occurs more slowly because it typically takes more time to lock onto a weaker signal. Therefore, there is an optimal point to switch beams. Relative proximity to the center of a satellite beam coverage zone is therefore a factor relied upon to adjust updated satellite map parameters for updated satellite map programs.

Figure 7:
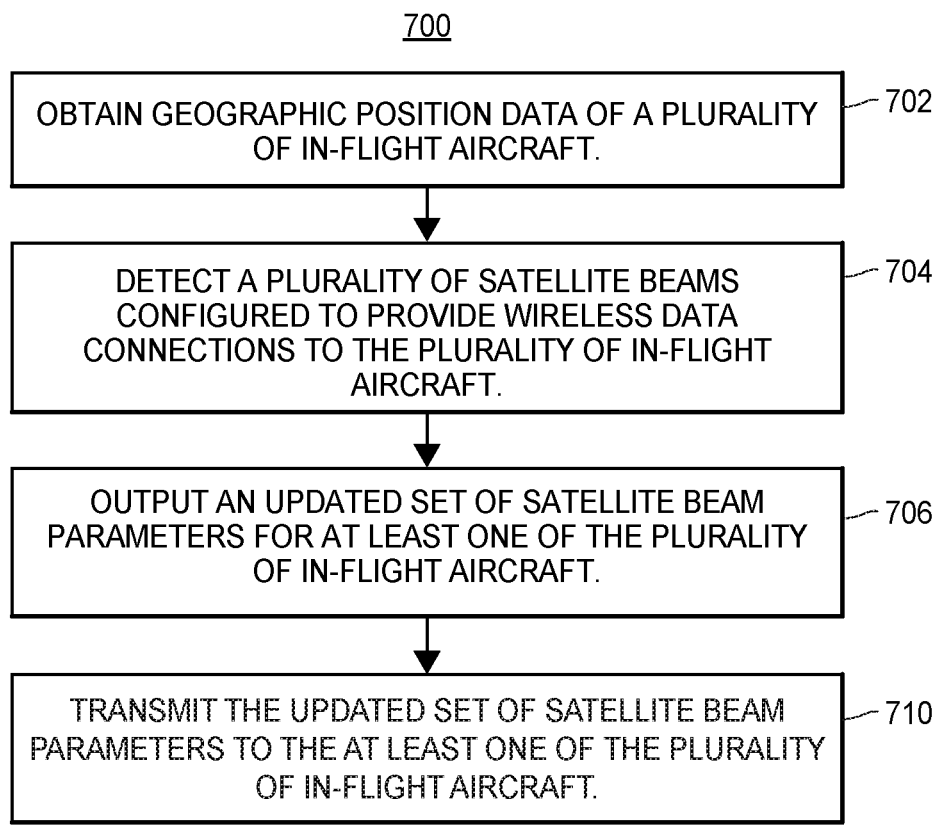
FIG. 7 illustrates example operations for updating satellite maps regarding satellite data connections among a group of in-flight aircraft.

FIG. 7 illustrates example operations 700 for updating a satellite map program on an in-flight aircraft. An obtaining operation 702 obtains geographic position data of a plurality of in-flight aircraft out of a fleet of aircraft that are capable of connecting to an in-flight connectivity system. Obtaining operation 702 may establish or approximate the geographical locations of aircraft in fleets of aircraft that are configured to connect to communications satellites. The obtaining operation 702 may rely on information including self-reported aircraft location, radar aircraft location, an aircraft's flight plan and information regarding revisions thereto, triangulated location, position reported by satellite, etc. to perform operation 702.

Obtaining operation 702 may also collect other information regarding an in-flight aircraft that has a bearing on the aircraft's future geographic position. Obtaining operation 702 may sense direction and speed information may be collected directly from an aircraft or indirectly (e.g., access to an aircraft's flight plan, instructions from an air-traffic controller to the aircraft, information regarding weather, local traffic, temporary and/or permanent flight restricted areas, an aircraft's final destination, etc.).

A detecting operation 704 detects, at a ground station, a plurality of satellite beams. Detecting operation 704 may query the satellites in the group of satellites directly via a Telco-data link with a teleport. In at least one implementation, detecting operation 704 collects information indirectly about each of the satellites in the group of satellites by collecting information from an aircraft that is connected to the respective satellites. The aircraft in the fleet of aircraft are themselves in communication with the ground station and can report on characteristics of the in-flight connectivity service the aircraft receive from the satellites as part of the detecting operation 704. One type of information that detecting operation 704 can collect via in-flight aircraft are the data rates for uplink and downlink with a satellite that the aircraft has experienced while connected to the satellite. Detecting operation 704 can also collect other information from in-flight aircraft that indicates loads on respective satellites in the group of satellites (e.g., when the aircraft was connected to a satellite, how long the aircraft was connected to the satellite, how much total data was exchanged between the aircraft and the satellite, how much data was customer data and how much data was system data, etc.).

An outputting operation 706 outputs an updated set of satellite map parameters. In an implementation, the updated satellite map parameters are only the values needed by an in-flight aircraft to assemble a new on-board satellite map program. In other words, the updated satellite map parameters do not include a complete satellite map program, or even omits many parts of a complete satellite map program, because in-flight aircraft need not refresh all information in the satellite map program (e.g., satellite beam connection information, beam status, connection intensity information, etc.) for each beam, but instead need only to update the parameters that the in-flight aircraft uses to determine the priority of a particular satellite beam based on the in-flight aircraft's geographical location. In another implementation, the outputting operation 706 outputs a complete satellite map program including updated satellite map parameters.

In an implementation, the outputting operation 706 outputs updated satellite map parameters designed to avoid in-flight connectivity service disruptions caused by outages to one or more communications satellites. In other implementations, the outputting operation 706 outputs updated satellite map parameters designed to avoid an expected wireless data connection outage condition at a future time (e.g., planned maintenance). Other quality of service factors may be taken into account in outputting operation 706 including weather, local traffic, temporary or permanent flight restricted areas, scheduled or unscheduled down-time for certain satellite beams, jet stream perturbations, atmospheric interferences, political or other disruptions to scheduled air travel routes, etc.

A transmitting operation 708 transmits to the one or more in-flight aircraft the updated satellite map parameters. In another implementation, the transmitting operation 708 transmits to the one or more in-flight aircraft the updated satellite map parameters via a Teleport to the in-flight aircraft via an existing wireless data connection with a satellite beam. In yet another implementation, the transmitting operation 708 transmits to the one or more in-flight aircraft the updated satellite map parameters via another type of data connection such as an ATG (air-to-ground) data connection, a terrestrial cellular modem, and/or via a physical data transfer (e.g., if the aircraft onboards the updated satellite map parameters when on the ground such as from a wired data connection, via transfer on physical storage media, etc.).

Figure 8:
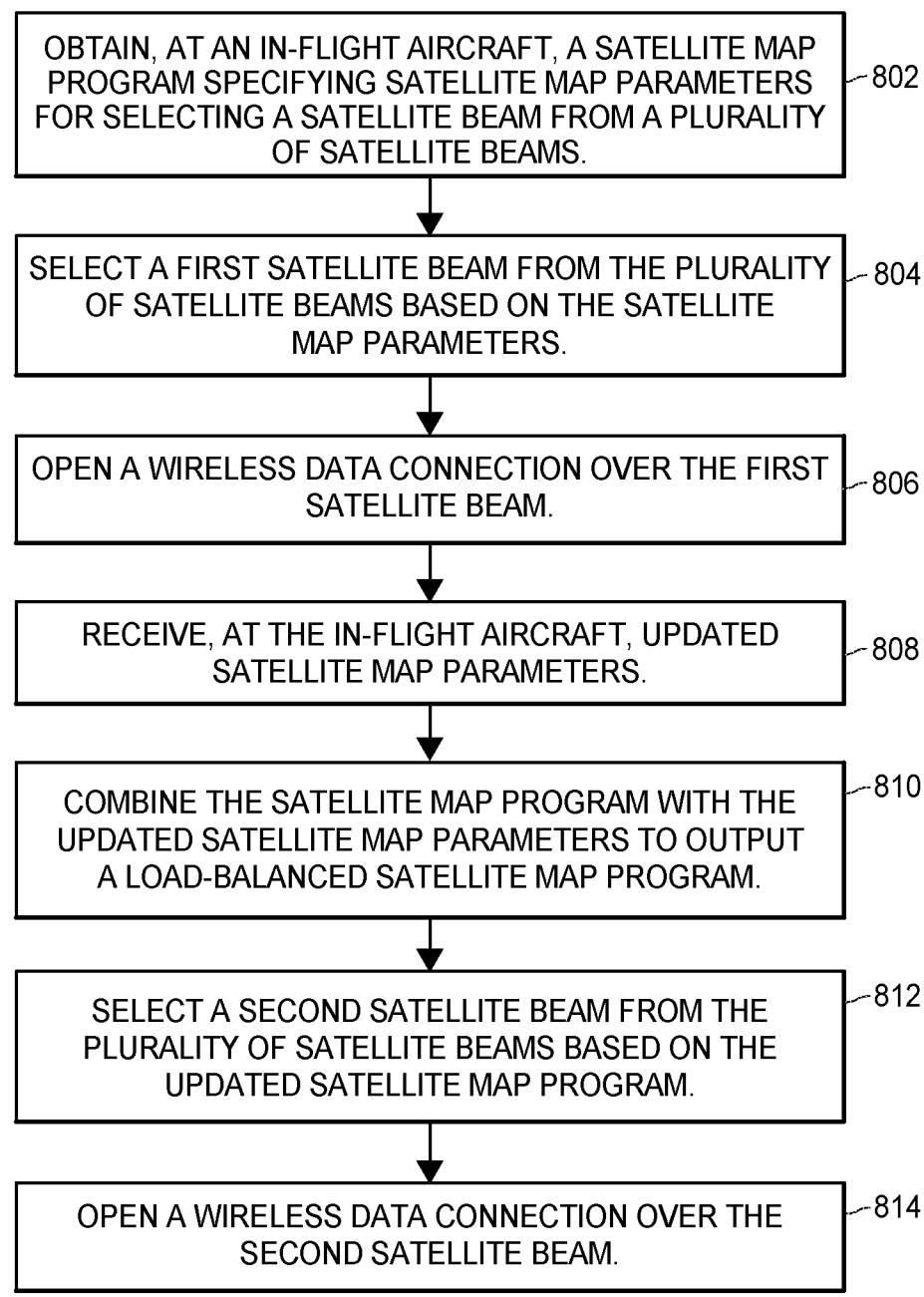
FIG. 8 illustrates example operations for updating satellite maps regarding satellite data connections among a group of in-flight aircraft.

FIG. 8 illustrates example operations 800 for selecting a satellite beam in an example system for updating satellite map parameters regarding a plurality of satellite beams providing in-flight connectivity. An obtaining operation 802 obtains, at an in-flight aircraft, a satellite map program specifying satellite map parameters for selecting a satellite beam from a plurality of satellite beams. The obtaining operation may utilize an existing wireless data connection with a satellite beam. In yet another implementation, the obtaining operation 802 obtains the satellite map program via another type of data connection such as an ATG (air-to-ground) data connection, a terrestrial cellular modem, and/or via a physical data transfer (e.g., if the aircraft onboards the updated satellite map parameters when on the ground such as from a wired data connection, via transfer on physical storage media, etc.).

The satellite map program obtained by the obtaining operation 802 may include other information relating to the selection of and connection to a satellite beam by an in-flight aircraft (e.g., satellite beam connection information, beam status, connection intensity information, etc.). The satellite map program obtained by the obtaining operation 802 may further include one or more timestamps defining a time period during which certain satellite map parameters are valid. After the expiration of the time period defined by the timestamps, other satellite map parameters may be substituted for the expired satellite map parameters. The timestamp information may be included due to other factors known to affect scheduled air travel (including weather, local traffic, temporary or permanent flight restricted areas, scheduled or unscheduled down-time for certain satellite beams, jet stream perturbations, atmospheric interferences, political or other disruptions to scheduled air travel routes, etc.).

A selecting operation 804 selects a first satellite beam from the plurality of satellite beams based on the satellite map parameters. The selecting operation 804 may apply satellite map parameters to apply a weight to the relative desirability of satellite beams available in the geographic region in which an in-flight aircraft is located. The satellite map parameters may be thought of as a function with the in-flight aircraft's geographic location as an independent variable that causes the satellite map parameters to change as the in-flight aircraft's geographic position changes. The satellite map parameters may alternatively, or additionally, be thought of as a function with the in-flight aircraft's speed and direction as other independent variables that cause the satellite map parameters to change as the in-flight aircraft's expected future geographic position changes.

In an implementation the selecting operation 804 selects the first satellite beam by means other than a modem on an in-flight aircraft. Instead, the selecting operation 804 may be performed by a Mobility Control Program (MCP) executing on an in-flight aircraft or another non-modem piece of communications equipment disposed on the in-flight aircraft. The in-flight aircraft therefore need not rely on a modem to itself select from available satellites according to the rules embodied on the modem itself. The satellite beam map updating system described herein takes satellite beam selection over from the logic embodied in a modem. The MCP is a higher-level program than the modem in that the MCP is aware of all the satellite beams contained in a map file, and can be optimized with current position information, and has the advantage of being able to be updated with up-to-date network information from the ground controller to make more optimized satellite beam selection choices than what would be available with static map files alone.

An opening operation 806 opens a wireless data connection over the first satellite beam. In an implementation, the opening operation 806 is performed by a modem on-board the in-flight aircraft and supplies in-flight connectivity to end-users on board the in-flight aircraft and to other systems on the in-flight aircraft that require in-flight connectivity services.

A receiving operation 808 receives, at the in-flight aircraft, via the first satellite beam, updated satellite map parameters that are different from the satellite map parameters included in the in-flight aircraft's satellite map program. In an implementation, the receiving operation 808 may utilize an existing wireless data connection with a satellite beam. In an alternative implementation, the receiving operation 808 receives the updated satellite map parameters via another type of data connection such as an ATG (air-to-ground) data connection, a terrestrial cellular modem, and/or via a physical data transfer (e.g., if the aircraft were to onboard the updated satellite map parameters when on the ground such as from a wired data connection, via transfer on physical storage media, etc.).

A combining operation 810 combines the satellite map program obtained in obtaining step 802 with the updated satellite map parameters received in receiving step 808 to output an updated satellite map program. In an implementation wherein the updated satellite map parameters comprise a complete satellite map program, the combining operation 810 discards any previous satellite map program and replaces it with the complete satellite map program received in receiving step 808. The combining operation 810 may output a temporary satellite map program if the updated satellite map parameters include expiration timestamps.

A selecting operation 812 selects a second satellite beam from the plurality of satellite beams based on the updated satellite map program. The selecting operation may take the in-flight aircraft's current geographical position and/or an expected future geographical position in selecting the second satellite beam. An opening operation 814 opens a wireless data connection over the second satellite beam according to the same principles as opening operation 806.

Figure 9:
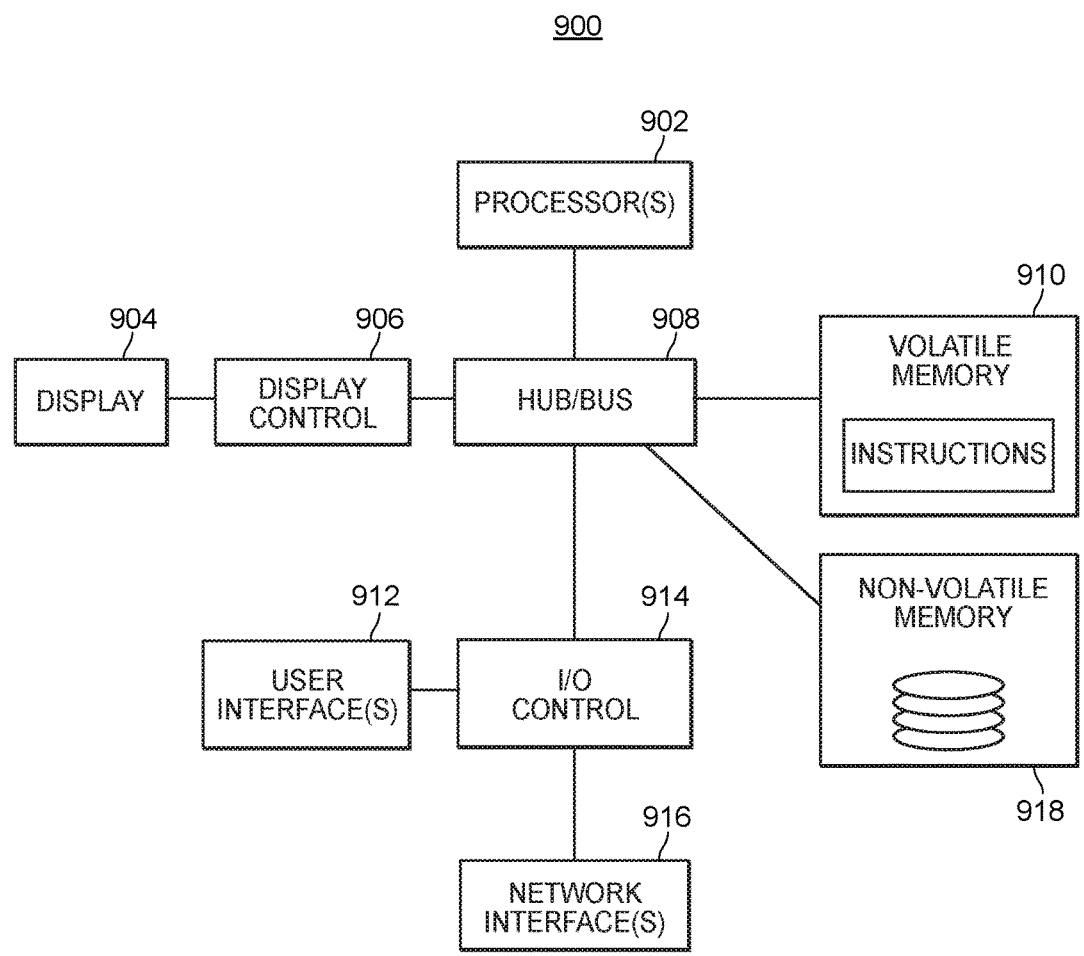
FIG. 9 illustrates an example system that may be useful in carrying out the implementations of a system for updating satellite maps regarding a plurality of satellite beams providing in-flight connectivity described herein.

FIG. 9 illustrates an example system 900 that may be useful in carrying out the implementations of a system for updating satellite map parameters for a plurality of satellite beams providing in-flight connectivity described herein. For example, one or more computing devices 900 may be particularly configured to be utilized as at least a portion of a ground station 408, a teleport 406, for on-board services on an in-flight aircraft, the satellites 402, and other components disclosed herein.

The computing device 900 may include, for example, one more central processing units (CPUs) or processors 902, and one or more busses or hubs 908 that connect the processor(s) 902 to other elements of the computing device, such as a volatile memory 910, a non-volatile memory 918, a display controller 906, and an I/O controller 914. The volatile memory 910 and the non-volatile memory 918 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 910 and/or the memory 918 may store instructions that are executable by the processor 902. For example, in a computing device particularly configured to be included in the ground station 408, the instructions may be the instructions comprising the satellite beam updating components described herein, for example with respect to FIG. 4. In another example, in a computing device 900 particularly configured to be on-board the in-flight aircraft, the instructions may be the instructions disclosed as performing the operations of the method 800. Indeed, each of the modules, applications and engines described herein can correspond to a different set of machine readable instructions for performing one or more functions described above. These modules need not be implemented as separate software programs, procedures or modules, and thus various subsets of these modules can be combined or otherwise re-arranged in various embodiments. In some embodiments, at least one of the memories 910, 918 stores a subset of the modules and data structures identified herein. In other embodiments, at least one of the memories 910, 918 stores additional modules and data structures not described herein.

In an embodiment, the display controller 906 may communicate with the processor(s) 902 to cause information to be presented on a connected display device 904. In an embodiment, the I/O controller 914 may communicate with the processor(s) 902 to transfer information and commands to/from the user interface 912, which may include a mouse, a keyboard or key pad, a touch pad, click wheel, lights, a speaker, a microphone, etc. In an embodiment, at least portions of the display device 904 and of the user interface 912 are combined in a single, integral device, e.g., a touch screen. Additionally, data or information may be transferred to and from the computing device 900 via a network interface 916. In some embodiments, the computing device 900 may include more than one network interface 916, such as a wireless interface and a wired interface.

The illustrated computing device 900 is only one example of a computing device suitable to be particularly configured for use in the satellite beam updating system described herein. Other embodiments of the computing device 900 may be also be for use in satellite beam updating system described herein, even if the other embodiments have more or fewer components than shown in FIG. 9, have one or more combined components, or have a different configuration or arrangement of the components. Moreover, the various components shown in FIG. 9 can be implemented in hardware, a processor executing software instructions, or a combination of both hardware and a processor executing software instructions, including one or more signal processing and/or application specific integrated circuits.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

A method of updating a satellite map program on an in-flight aircraft, the method comprising: obtaining geographic position data of a plurality of in-flight aircraft; detecting a plurality of satellite beams configured to provide wireless data connections to the plurality of in-flight aircraft based on the obtaining operation, each of the plurality of in-flight aircraft having a satellite map including a set of satellite map parameters for selecting a satellite beam of the plurality of satellite beams; outputting, at an in-flight connectivity ground station, an updated set of satellite beam connection parameters for at least one of the plurality of in-flight aircraft, the at least one of the plurality of in-flight aircraft being configured to connect a modem to a selected satellite beam of the plurality of satellite beams according to satellite map parameters in an on-board satellite map program; and transmitting by the in-flight connectivity ground station, the updated set of satellite beam connection parameters to the at least one of the plurality of in-flight aircraft.

The method of the previous aspect, further including: determining whether a satellite originating one or more of the satellite beams satisfies an outage condition, the updated set of satellite beam connection parameters depending on the determining operation, the updated set of satellite beam connection parameters further including an instruction to not connect to the satellite that satisfies the outage condition.

The method of any combination of the previous aspects, wherein the updated set of satellite parameters comprise changes to the satellite map program.

The method of any combination of the previous aspects, wherein the updated set of satellite parameters comprise a complete satellite map program.

The method of any combination of the previous aspects, wherein the updated set of satellite parameters includes relative priorities of the plurality of satellite beams.

The method of any combination of the previous aspects, wherein the updated set of satellite parameters includes an instruction to resume a connection with one of the plurality of satellite beams.

The method of any combination of the previous aspects, wherein the set of updated satellite map parameters lower a priority of one of the plurality satellite beams during a maintenance time period, the one of the plurality of satellite beams originating at a satellite undergoing maintenance during the maintenance time period.

The method of any combination of the previous aspects, wherein the updated set of satellite map parameters include desirability values for the plurality of satellite beams, the disirability values being based at least in part on a location of the one or more in-flight aircraft.

The method of any combination of the previous aspects, wherein the load balanced satellite map parameters further include desirability margin values, the desirability margin values being an amount by which a quality of service improvement must exceed before switching satellite beams.

A system for updating a satellite map program on an in-flight aircraft comprising: an in-flight aircraft geographic locator configured to collect geographic locations of a plurality of in-flight aircraft; a satellite beam inspector configured to evaluate a readiness of each of a plurality of satellite beams; a satellite beam map updater configured to: determine whether one or more satellite beams of the plurality of satellite beams does not satisfy a readiness condition; generate one or more sets of updated satellite map parameters configured to modify a satellite map program on-board in-flight aircraft; and a data transmitter configured to transmit the at least one of the one or more updated satellite map parameters to one or more of the plurality of in-flight aircraft.

The system of the previous aspect, wherein the readiness condition is not satisfied if one of the one or more satellite beams is unavailable.

The system of any combination of the previous aspects, wherein the readiness condition is not satisfied if one of the one or more satellite beams is scheduled for maintenance.

The system of any combination of the previous aspects, wherein the one or more sets of updated satellite map parameters include a relative priority ranking of the plurality of satellite beams.

The system of any combination of the previous aspects, wherein the one or more sets of updated satellite map parameters includes instructions to disconnect from a particular satellite beam if an in-flight aircraft is connected thereto.

The system of any combination of the previous aspects, wherein the updated satellite map parameters include one or more timestamps specifying time periods during which the satellite map parameters are valid.

The system of any combination of the previous aspects, wherein the satellite beam updater is further configured to generate the one or more sets of updated satellite map parameters based at least in part on one of: weather patterns, jet stream perturbations, local traffic, route changes, and seasonal demand.

A method of selecting a satellite beam, the method comprising: obtaining, at an in-flight aircraft, a satellite map program specifying satellite map parameters for selecting a satellite beam from a plurality of satellite beams; selecting a first satellite beam from the plurality of satellite beams based on the satellite map parameters; opening a wireless data connection over the first satellite beam; receiving, at the in-flight aircraft, via the first satellite beam updated satellite map parameters; combining the satellite map program with the updated satellite map parameters to output an updated satellite map program; selecting a second satellite beam from the plurality of satellite beams based on the updated satellite map program; and opening a wireless data connection over the second satellite beam.

The method of the previous aspect, wherein the operations that select the first satellite beam and the second satellite beam based on the updated satellite map program are not performed by an on-board modem.

The method of any combination of the previous aspects, wherein the updated satellite map parameters constitute a complete satellite map program.

The method of any combination of the previous aspects, further comprising: discarding the different satellite map parameters after expiration of a time period specified by a timestamp, the timestamp being included in the updated satellite map parameters.

What is claimed:

1. A method of updating a satellite map program on an in-flight aircraft, the method comprising:
    obtaining geographic position data of a plurality of in-flight aircraft;
    detecting a plurality of satellite beams configured to provide wireless data connections to the plurality of in-flight aircraft based on the obtaining operation, each of the plurality of in-flight aircraft having a satellite map including a set of satellite map parameters for selecting a satellite beam of the plurality of satellite beams;
    outputting, at an in-flight connectivity ground station, an updated set of satellite beam connection parameters for at least one of the plurality of in-flight aircraft, the at least one of the plurality of in-flight aircraft being configured to connect a modem to a selected satellite beam of the plurality of satellite beams according to satellite map parameters in an on-board satellite map program; and
    transmitting by the in-flight connectivity ground station, the updated set of satellite beam connection parameters to the at least one of the plurality of in-flight aircraft.

2. The method of claim 1, further including:
    determining whether a satellite originating one or more of the satellite beams satisfies an outage condition, the updated set of satellite beam connection parameters depending on the determining operation, the updated set of satellite beam connection parameters further including an instruction to not connect to the satellite that satisfies the outage condition.

3. The method of claim 1, wherein the updated set of satellite parameters comprise changes to the satellite map program.

4. The method of claim 1, wherein the updated set of satellite parameters comprise a complete satellite map program.

5. The method of claim 1, wherein the updated set of satellite parameters includes relative priorities of the plurality of satellite beams.

6. The method of claim 1, wherein the updated set of satellite parameters includes an instruction to resume a connection with one of the plurality of satellite beams.

7. The method of claim 1, wherein the set of updated satellite map parameters lower a priority of one of the plurality satellite beams during a maintenance time period, the one of the plurality of satellite beams originating at a satellite undergoing maintenance during the maintenance time period.

8. The method of claim 1, wherein the updated set of satellite map parameters include desirability values for the plurality of satellite beams, the desirability values being based at least in part on a location of the one or more in-flight aircraft.

9. The method of claim 8, wherein the load balanced satellite map parameters further include desirability margin values, the desirability margin values being an amount by which a quality of service improvement must exceed before switching satellite beams.

10. A system for updating a satellite map program on an in-flight aircraft comprising:
    an in-flight aircraft geographic locator configured to collect geographic locations of a plurality of in-flight aircraft;
    a satellite beam inspector configured to evaluate a readiness of each of a plurality of satellite beams;
    a satellite beam map updater configured to:
        determine whether one or more satellite beams of the plurality of satellite beams does not satisfy a readiness condition;
        generate one or more sets of updated satellite map parameters configured to modify a satellite map program on-board in-flight aircraft; and
    a data transmitter configured to transmit the at least one of the one or more updated satellite map parameters to one or more of the plurality of in-flight aircraft.

11. The system of claim 10, wherein the readiness condition is not satisfied if one of the one or more satellite beams is unavailable.

12. The system of claim 10, wherein the readiness condition is not satisfied if one of the one or more satellite beams is scheduled for maintenance.

13. The system of claim 10, wherein the one or more sets of updated satellite map parameters include a relative priority ranking of the plurality of satellite beams.

14. The system of claim 10, wherein the one or more sets of updated satellite map parameters includes instructions to disconnect from a particular satellite beam if an in-flight aircraft is connected thereto.

15. The system of claim 10, wherein the updated satellite map parameters include one or more timestamps specifying time periods during which the satellite map parameters are valid.

16. The system of claim 10, wherein the satellite beam updater is further configured to generate the one or more sets of updated satellite map parameters based at least in part on one of: weather patterns, jet stream perturbations, local traffic, route changes, and seasonal demand.

17. A method of selecting a satellite beam, the method comprising:
    obtaining, at an in-flight aircraft, a satellite map program specifying satellite map parameters for selecting a satellite beam from a plurality of satellite beams;
    selecting a first satellite beam from the plurality of satellite beams based on the satellite map parameters;
    opening a wireless data connection over the first satellite beam;
    receiving, at the in-flight aircraft, via the first satellite beam updated satellite map parameters;
    combining the satellite map program with the updated satellite map parameters to output an updated satellite map program;
    selecting a second satellite beam from the plurality of satellite beams based on the updated satellite map program; and
    opening a wireless data connection over the second satellite beam.

18. The method of claim 17, wherein the operations that select the first satellite beam and the second satellite beam based on the updated satellite map program are not performed by an on-board modem.

19. The method of claim 17, wherein the updated satellite map parameters constitute a complete satellite map program.

20. The method of claim 17, further comprising:
discarding the different satellite map parameters after expiration of a time period specified by a timestamp, the timestamp being included in the updated satellite map parameters.

\* \* \* \* \*